(12) United States Patent
Harter, Jr. et al.

(10) Patent No.: US 6,668,221 B2
(45) Date of Patent: Dec. 23, 2003

(54) USER DISCRIMINATION CONTROL OF VEHICLE INFOTAINMENT SYSTEM

(75) Inventors: Joseph E. Harter, Jr., Kokomo, IN (US); Gregory K. Scharenbroch, Kokomo, IN (US); William W. Fultz, Carmel, IN (US); Dennis P. Griffin, Noblesville, IN (US); Gerald J. Witt, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/154,362

(22) Filed: May 23, 2002

(65) Prior Publication Data

US 2003/0220725 A1 Nov. 27, 2003

(51) Int. Cl.[7] ................................................. G06F 7/00
(52) U.S. Cl. ........................................................ 701/36
(58) Field of Search ............................ 701/36; 345/158, 345/166, 173, 5; 348/118

(56) References Cited

U.S. PATENT DOCUMENTS 4,625,329 A * 11/1986 Ishikawa et al. ............ 382/104
6,181,996 B1 * 1/2001 Chou et al. .................... 701/36

* cited by examiner

Primary Examiner—Yonel Beaulieu
(74) Attorney, Agent, or Firm—Jimmy L. Funke; Stefan V. Chmielewski

(57) ABSTRACT

A user discrimination control system controls functionality made available by a vehicle infotainment device by reducing functionality provided to the driver while allowing enhanced functionality to another passenger in the vehicle. The system includes a human machine interface located in a vehicle for allowing an occupant to interface with the infotainment device. A passenger detection sensor senses a condition indicative of a passenger other than the driver interfacing with the human machine interface. A video imaging system detects a driver distraction condition. A controller controls functions made available by the infotainment device by allowing one of first and second levels of functionality based on the sensed conditions.

29 Claims, 5 Drawing Sheets

USER DISCRIMINATION CONTROL OF VEHICLE INFOTAINMENT SYSTEM

TECHNICAL FIELD

The present invention generally relates to vehicle electronic systems, such as entertainment and information systems and, more particularly relates to controlling functionality of electronic devices made available to occupants in a vehicle to minimize distraction to the driver of the vehicle.

BACKGROUND OF THE INVENTION

Automotive passenger vehicles are increasingly equipped with various electronic entertainment and information systems, generally referred to herein as infotainment devices and infotainment systems. For example, automotive personal computing (PC) devices have been installed in vehicles to allow, personal computing, web browsing, and Internet access. Radio and satellite communication devices such as radio data systems and roadside assistance systems have also been installed on vehicles. Various vehicle installed mobile multimedia systems also allow for the communication of information to and from occupants in the vehicle. Many infotainment devices typically include a human machine interface (HMI) for enabling a user to interface with the device. For example, the human machine interface may include a display for viewing messages, navigational maps, and other information. In addition, the human machine interface may include input controls for manipulation by a user to input commands to the infotainment device.

In order to reduce distraction to the driver (operator) of the vehicle, it may be desirable to inhibit the availability of some functions (features) of the infotainment device to the driver while the vehicle is in motion. It has been proposed to allow full functionality of certain infotainment devices when the vehicle is stopped, and to allow less functionality when the vehicle is in motion. Thus, the vehicle must be stopped in order to make available certain features of the infotainment device. As a consequence, certain functions and features of the infotainment device are not made available to the driver as well as other occupants in the vehicle.

It has also been proposed in U.S. application Ser. No. 10/103,202, filed Mar. 21, 2002, to employ video cameras in a vehicle to allow video image tracking of the driver of a vehicle to determine various facial characteristics of the driver including position, orientation, and movement of the driver's eyes, face, and head. By knowing certain driver facial characteristics such as driver's gaze, ocular data, head position, and other characteristics, vehicle control systems can provide enhanced vehicle functions. For example, a vehicle control system can advise the driver of driver distraction as well as control various vehicle functions.

It is desirable to provide for a system and method for controlling an infotainment device on a vehicle to control the availability of functions made available to a driver of the vehicle, particularly when the driver may be distracted by the device. In particular, it is desirable to provide for such a system and method which may allow enhanced functionality of infotainment devices to passengers other than the driver of the vehicle.

SUMMARY OF THE INVENTION

The present invention provides for a user discrimination system and method of controlling an electronic device, such as an infotainment device, in a vehicle to inhibit functions made available to the driver while allowing enhanced functionality to another passenger in the vehicle. According to one aspect of the present invention, the user discrimination system includes a human machine interface located in a passenger compartment of a vehicle for allowing an occupant to interface with the electronic device. The system also provides for a passenger detection sensor for sensing a condition indicative of a passenger other than the driver interfacing with the human machine interface. The system further includes a controller for controlling functionality of the electronic device. The controller provides one of first and second levels of functionality based on the sensed condition.

According to another aspect of the present invention, the user discrimination system includes a driver distraction sensor for detecting a driver distraction condition indicative of distraction of the driver of the vehicle. A controller controls functionality of the electronic device. The controller provides one of first and second levels of functionality of the electronic device based on the sensed driver distraction condition.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
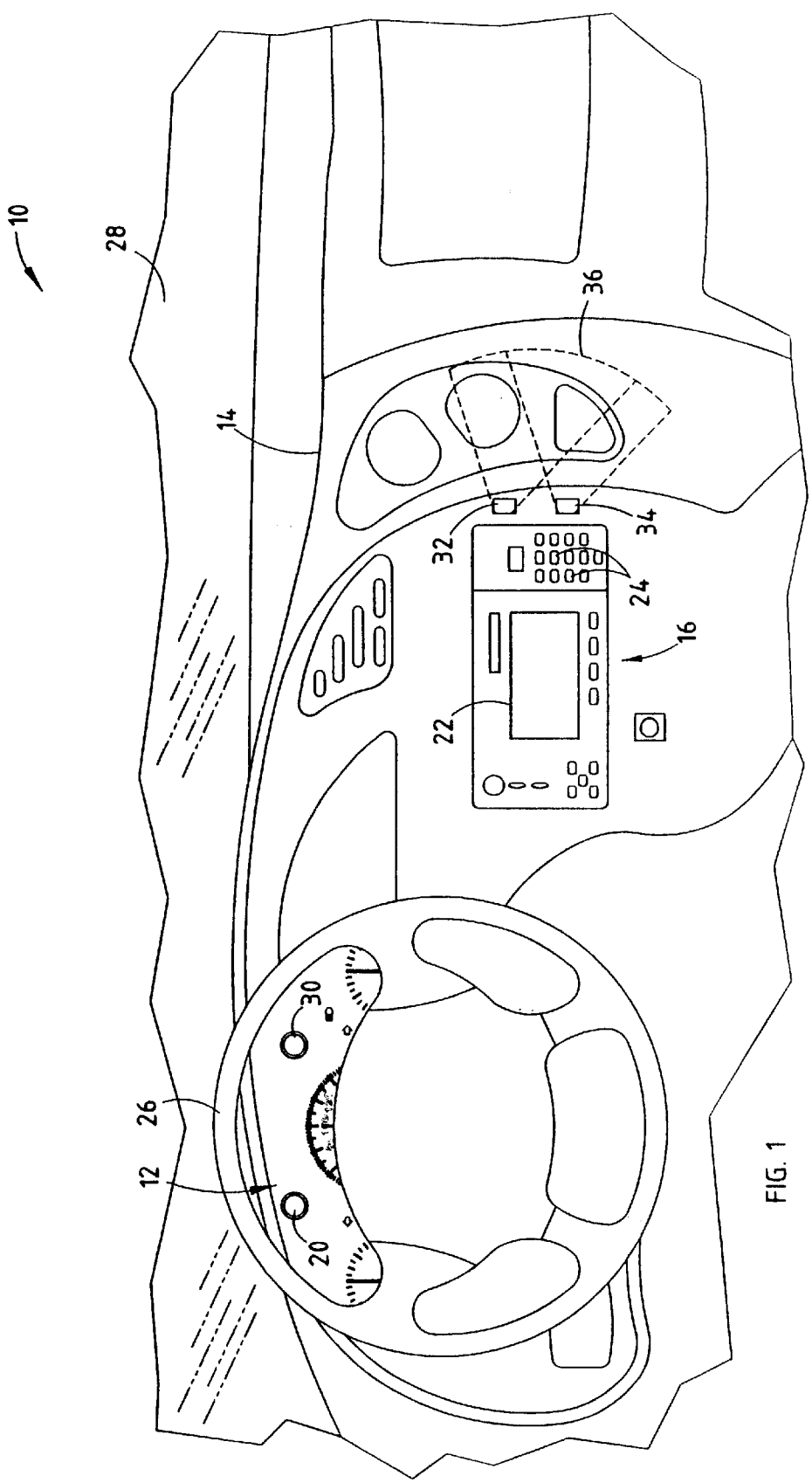
FIG. 1 is a front view of a vehicle instrument cluster and dash having an infotainment device, a pair of video cameras, and proximity sensors according to the present invention.

Referring to FIG. 1, an instrument cluster 12 and dash 14 are generally shown within the passenger compartment of a vehicle 10, generally located in front of the driver and front passenger seats (not shown) of the vehicle 10. The instrument cluster 12 is conventionally located in the vehicle dash 14 at the front of the passenger compartment, forward of the steering wheel 26 and steering column. Accordingly, the instrument cluster 12 is located in front of the vehicle driver and is viewable below the front windshield 28 so that the instrument cluster 12 is readily viewable by the driver. The dash 14 extends in front of both the driver and the front passenger seats and is located below the front windshield 28.

Centrally mounted within the dash 14 is an electronic infotainment device 16 which is accessible to both the driver of the vehicle and another passenger. The infotainment device 16 is an electronic device which generally includes any of a variety of information and entertainment systems commonly known in the art. For example, the infotainment device may include any one of or a combination of the following systems: an automotive personal computing device, a web browser, an Internet access device, a satellite communication system, a mobile multimedia system, a radio, a television, a DVD player, a navigation system and a phone/address book lookup system, and other types of electronic devices and systems.

The infotainment device 16 includes a human machine interface (HMI) for allowing occupants in the vehicle, including the driver and other passenger(s), to interface with the infotainment device. The human machine interface may include a display 22 for displaying messages and other information, and input controls 24 for inputting user control commands. It should be appreciated that the human machine interface may include any of various inputs and output devices including other conventional inputs such as a microphone and touch screen inputs, and outputs including audio speakers and LED lights.

Mounted within the instrument cluster 12 are one or more video cameras for generating video images of the driver of the vehicle. The acquired images may be processed for tracking one or more facial characteristics of the vehicle driver, such as the driver's eyes to determine driver gaze. According to the embodiment shown and described herein, two video cameras are integrated within the instrument cluster 12 and are referred to herein as first camera 20 and second camera 30. While first and second video cameras 20 and 30 are disclosed herein in detail, it should be appreciated that one or more than two video cameras may be mounted at various locations in the vehicle without departing from the teachings of the present invention.

Figure 2:
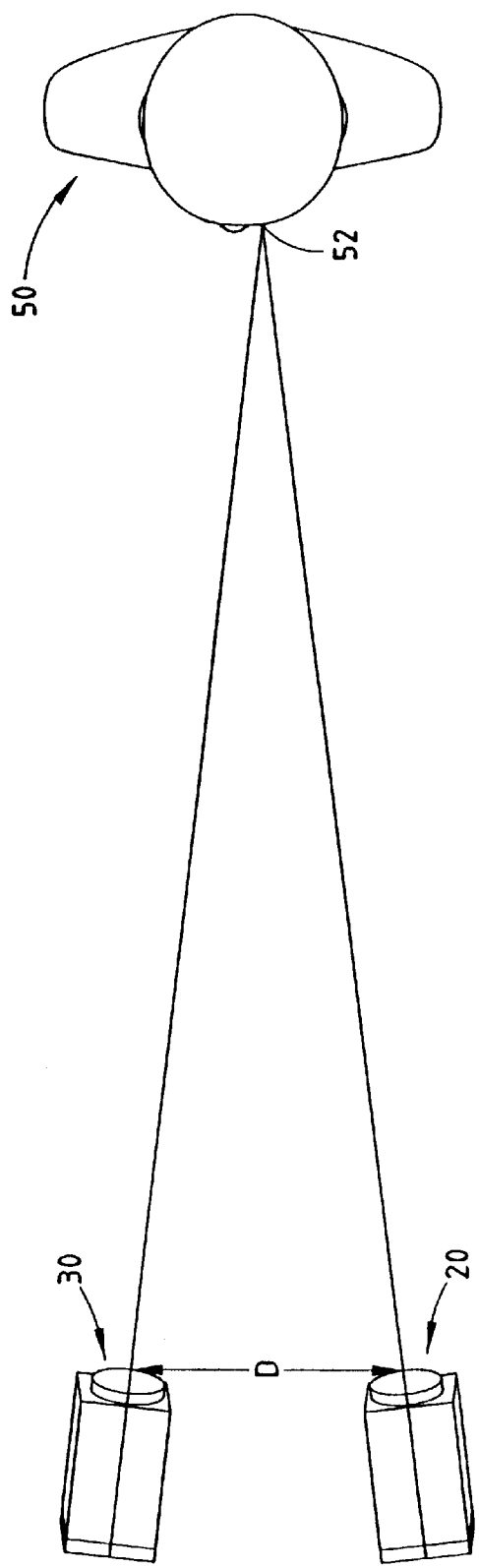
FIG. 2 is a top perspective view of the projection of the pair of video cameras toward the face of a vehicle driver.
Figure 3:
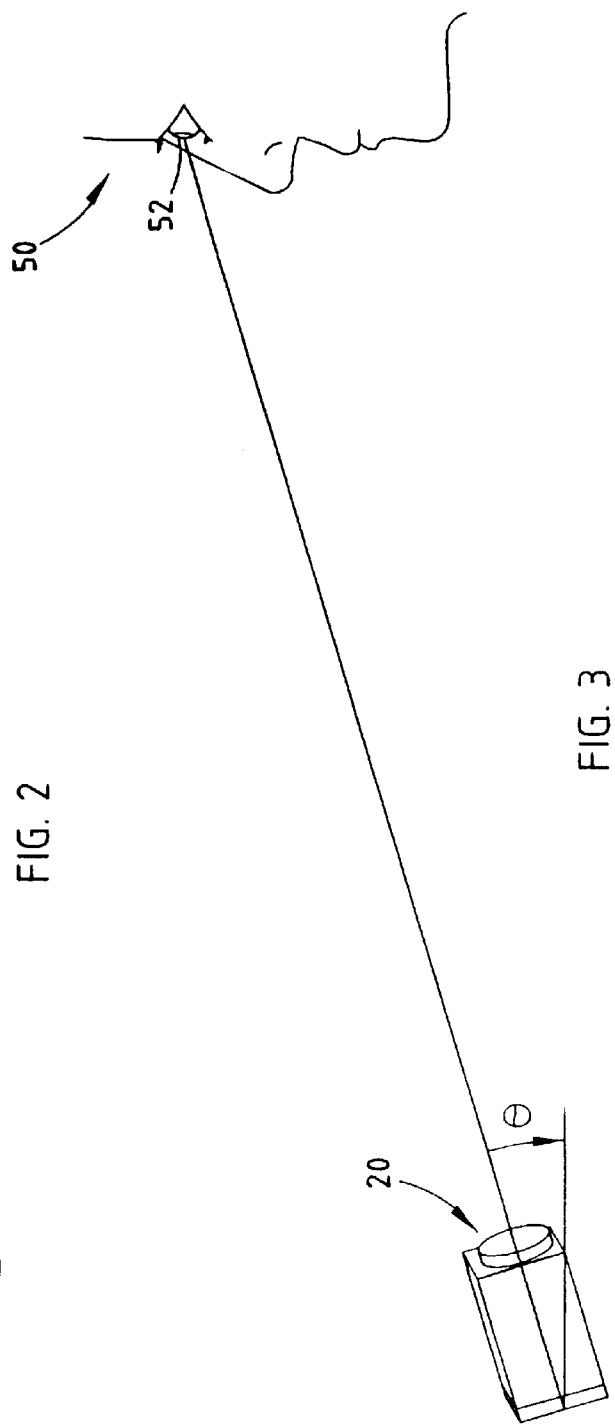
FIG. 3 is a side perspective view of the projection of one of the video cameras toward the face of the driver.

The first and second cameras 20 and 30 are shown mounted in the instrument cluster 12, such that each camera captures an image of the region where the driver of the vehicle is expected to be located during normal vehicle driving conditions. More particularly, the acquired images capture the driver's face, including one or both eyes and the surrounding ocular features generally formed in the area referred to as the ocular adnexa. Referring to FIGS. 2 and 3, the video cameras 20 and 30 are shown focused on an eye 52 of the driver's face 50. As is particularly seen in FIG. 2, the first and second cameras 20 and 30 are spaced apart from each other by a distance D in the range of about eight to fifteen centimeters (8 to 15 cm). By mounting the first and second cameras 20 and 30 side-by-side and separated by a minimum distance D of eight centimeters (8 cm), images of the front and both left and right sides of the driver's face may be obtained. This allows for enhanced imaging of the driver's facial characteristics, particularly during extended rotation of the driver's head (e.g., 120° of side-to-side rotation). Additionally, the use of two spaced cameras 20 and 30 provides a stereo signal which further allows for the determination of distance to a target feature.

With particular reference to FIG. 3, the first camera 20 is shown focused at an inclination angle θ relative to the horizontal plane of the vehicle. The inclination angle θ is within the range of fifteen to thirty degrees (15° to 30°). An inclination range θ in the range of fifteen to thirty degrees (15° to 30°) provides a clear view of the driver's ocular features including one or both eyeballs and the pupil of each eyeball, the superior and inferior eyelids, and the palpebral fissure space between the eyelids. The second camera 30 is similarly mounted at the same or similar inclination angle θ.

The video cameras 20 and 30 may include CCD/CMOS active-pixel digital image sensors mounted as individual chips onto a circuit board within the instrument cluster. One example of a CMOS active-pixel digital image sensor is Model No. PB-0330, commercially available from Photobit, which has a resolution of 640 H×480V. The use of digital image sensors for each of the first and second cameras 20 and 30 also allows for the detection of stereo information. An example of first and second video cameras mounted in the instrument cluster of a vehicle for tracking facial characteristics of the driver of the vehicle is disclosed in U.S. application Ser. No. 10/103,202, filed on Mar. 21, 2002, entitled "VEHICLE INSTRUMENT CLUSTER HAVING INTEGRATED IMAGING SYSTEM," the entire disclosure of which is hereby incorporated herein by reference.

Referring back to FIG. 1, first and second proximity sensors 32 and 34 are shown located within dash 14 generally forward of the passenger seat and in close proximity to the human machine interface of the infotainment device 16. Proximity sensors 32 and 34 are infrared (IR) sensors which generate infrared beams generally in the shape of a curtain 36 between the human machine interface of the infotainment device 16 and the front passenger. Proximity sensors 32 and 34 may include commercially available fixed-field IR sensors such as Model No. QMT42, commercially available from Banner Engineering Corporation. The IR curtain 36 detects a condition indicative of when a passenger, other than the driver, seated in the passenger seat is attempting to interact with the human machine interface of the infotainment device 16. When the passenger reaches for the input controls 24 of the human machine interface on the infotainment device 16, the sensor curtain 36 detects the presence of the passenger's hand and/or arm breaking the IR curtain 36 and generates an output signal indicative of the presence of the passenger attempting to interface with the infotainment device 16.

Figure 4:
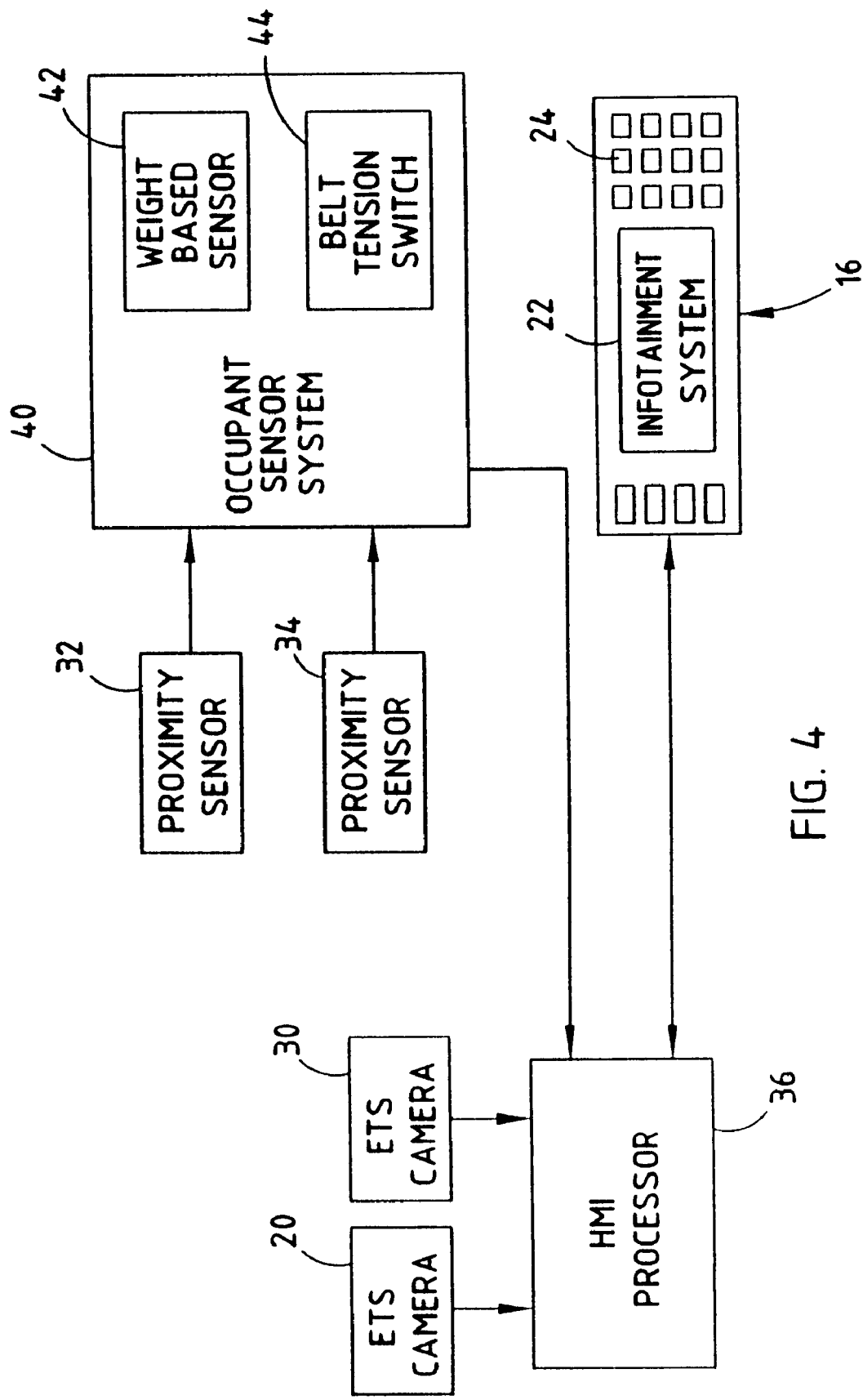
FIG. 4 is a block diagram illustrating a user discrimination control system for controlling functionality of the infotainment device.

Referring to FIG. 4, the user discrimination control system is further illustrated for controlling functionality and content of the infotainment device 16. The first and second cameras 20 and 30 are shown providing inputs to a human machine interface (HMI) processor 36. The processor 36 includes a video processor for processing the received video images and is configured to perform one or more routines to identify and track one or more features of the acquired video images to detect driver gaze. By processing images of the driver's eyes, the processor 36 detects when the driver is gazing towards the infotainment device 16 so as to detect a condition indicative of the driver distracted by the infotainment device 16. In response to detecting a distracted driver condition, the processor 36 may reduce the available functionality of the infotainment device 16.

The user discrimination control system further includes an occupant sensor system 40 for sensing the presence of a passenger, other than the driver, located in the front passenger seat of the vehicle, and for further detecting the type of passenger, such as whether the passenger is a child or an adult. The occupant sensor system 40 receives the output signals generated by first and second proximity sensor 32 and 34 and determines if the IR curtain 36 has been broken which is indicative of a condition in which a passenger, other than the driver, is interacting with the infotainment device 16.

The occupant sensor system 40 also includes a weight based sensor 42 and a belt tension switch 44. The weight based sensor 42 detects the amount of weight and the distribution of the weight on the passenger seat to detect the presence of a passenger other than the driver seated in the front passenger seat adjacent to the driver's seat. The belt tension switch 44 detects the tension on the seatbelt associated with the passenger seat. By knowing the seatbelt tension and weight distribution, the occupant sensor system 40 can determine if the passenger is a child or an adult. Accordingly, the occupant sensor system 40 determines the presence of a passenger, whether the passenger detected is a child or an adult, and whether the passenger is attempting to interface with the infotainment device 16. The occupant sensor system 40 provides the determined information to the human machine interface processor 36 which, in turn, further processes the information according to a control routine described hereinafter to control functionality made available by the infotainment device 16.

Figure 5A:
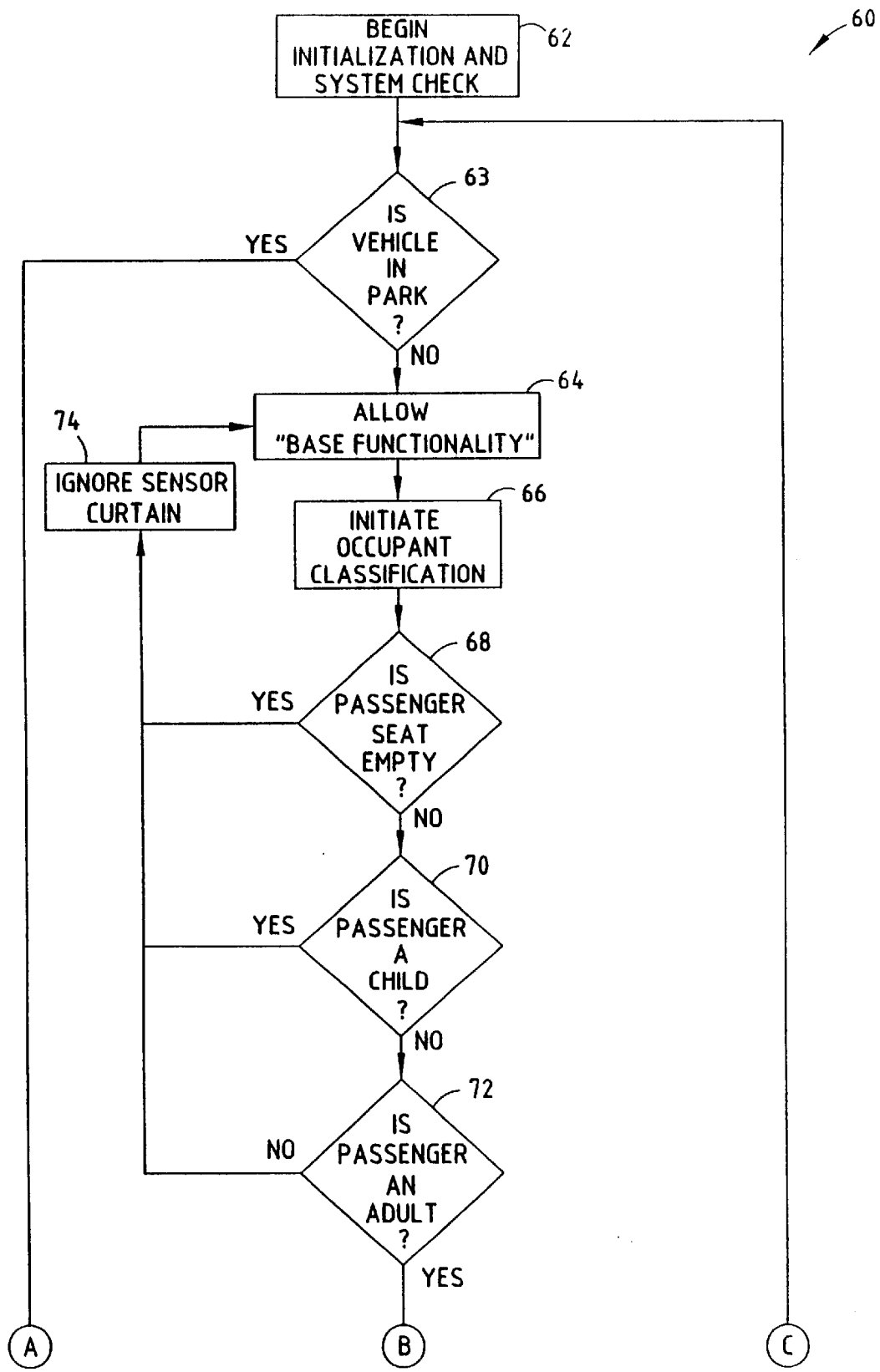
FIGS. 5A and 5B is a flow diagram illustrating a method of controlling functionality of the infotainment device according to the present invention.
Figure 5B:
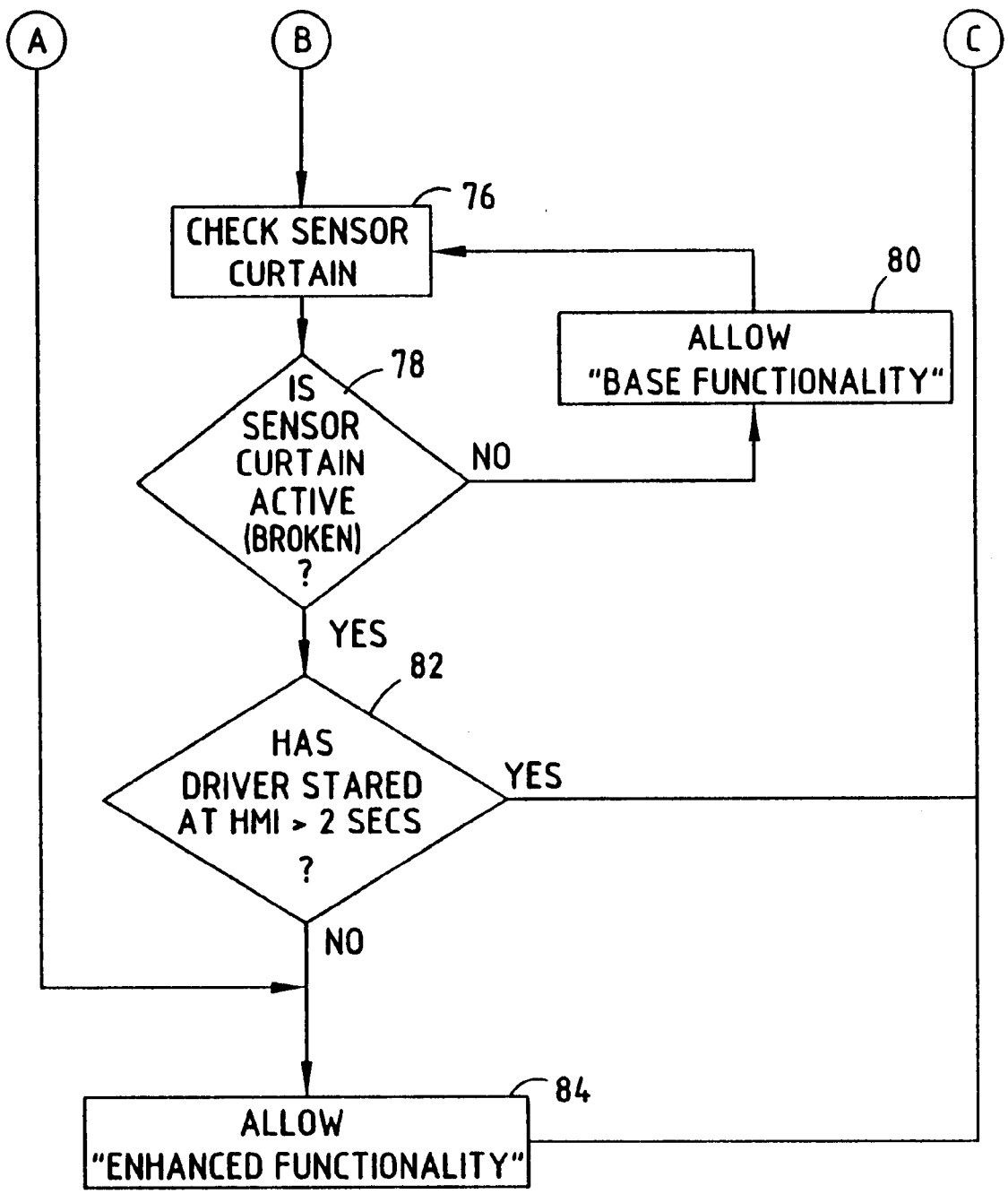

Referring to FIGS. 5A and 5B, a user discrimination control routine 60 is provided for controlling the functionality of the infotainment device 16 based on the various sensed inputs. The control routine 60 begins at step 62 to perform an initialization during power-up, and a system check which includes validating operation of system sensors. Proceeding to step 63, control routine 60 checks for whether the vehicle transmission is in park, and thus the vehicle is not moving. If the vehicle transmission is in park, control routine 60 proceeds to step 84 to allow a first level of enhanced functionality of the infotainment device. Otherwise, if the vehicle transmission is not in park, indicative of a vehicle that is moving, control routine 60 proceeds to step 64 to allow a limited second level of base functionality. The second level of base functionality is a default setting which provides a reduced amount of functionality as compared to the first level enhanced functionality. Control routine 60 then proceeds to step 66 to initiate occupant classification which provides parameters specific to the type of vehicle platform.

Following occupant classification initiation, the user discrimination control routine 60 proceeds to decision step 68 to check if the passenger seat is empty. If the passenger seat is empty, control routine 60 ignores the sensor curtain in step 74 and returns to step 66 to allow only the second level base functionality. If the passenger seat is not empty, decision step 70 checks for whether the passenger is a child and, if so, ignores the sensor curtain in step 74 and allows only the base functionality in step 64. If the passenger is not a child, decision step 72 determines if the passenger is an adult and, if not, proceeds to ignore the sensor curtain and allow only base functionality in step 74 and 64, respectively. If the passenger is an adult, control routine 60 proceeds to step 76 to check the sensor curtain.

When checking the sensor curtain, user discrimination control routine 60 checks for whether the sensor curtain is active (i.e., broken), which is indicative of a passenger interfacing with the human machine interface of the infotainment device. If the sensor curtain is not active, control routine 60 proceeds to step 80 to allow only the base functionality, before returning to step 76 to check the sensor curtain.

If the sensor curtain is active, user discrimination control routine 60 proceeds to decision step 82 to determine if the driver has stared continuously at the human machine interface for a time period of greater than two seconds, for example. If the driver has been staring at the human machine interface for greater than two seconds, control routine 60 returns to step 63. However, if the driver has not been staring at the human machine interface for greater than two seconds, routine 60 allows for enhanced functionality of the infotainment device in step 84.

By determining that a passenger is present, the passenger is an adult, the adult is interfacing with the human machine interface of the infotainment device, and the driver is not distracted by staring at the human machine interface for more than two seconds, control routine 60 allows for the first level of enhanced functionality of the infotainment system so that the passenger in the vehicle may interface with the infotainment device. Accordingly, if the driver is distracted and stares at the human machine interface of the infotainment device, the control routine 60 will disallow enhanced functionality and only allow for base functionality to be made available to the passengers in the vehicle.

It should be appreciated that the control routine may be processed by the human machine interface processor 36, the occupant sensor system 40, or other analog or digital controls made available on a vehicle. It should further be appreciated that the amount of functionality provided in the first level of enhanced functionality and the second level of base functionality may vary depending on the type of infotainment device and the vehicle. While first and second levels of functionality have been described herein, it should be appreciated that a further level of control of functionality may be provided, without departing from the teachings of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A user discrimination control system for use in controlling an electronic device in a vehicle adapted to transport a driver and one or more passengers, said system comprising:

a human machine interface located in a passenger compartment of the vehicle for allowing an occupant in the vehicle to interface with the electronic device;

a passenger detection sensor for sensing a condition indicative of a passenger other than the driver interfacing with the human machine interface; and a controller for controlling the functions made available by the electronic device, wherein the controller provides one of first and second levels of functionality based on the sensed condition.

2. The user discrimination control system as defined in claim 1 further comprising a driver distraction sensor for sensing a condition indicative of distraction of the driver, wherein the controller reduces functionality of the electronic device when driver distraction is detected.

3. The user discrimination control system as defined in claim 2, wherein the driver distraction sensor comprises an imaging camera for monitoring a facial characteristic of the driver.

4. The user discrimination control system as defined in claim 3, wherein the facial characteristic comprises eye gaze of the driver.

5. The user discrimination control system as defined in claim 1, wherein the passenger sensor comprises a proximity sensor for detecting movement of the passenger in close proximity to the human machine interface.

6. The user discrimination control system as defined in claim 1, wherein the electronic device comprises an infotainment device.

7. The user discrimination control system as defined in claim 1 further comprising a sensor for determining the presence of a passenger in the vehicle, wherein the controller provides reduced functionality when a passenger is not detected.

8. The user discrimination control system as defined in claim 7, wherein the system determines if the passenger is one of an adult and a child, wherein the controller reduces functionality of the system when the passenger is a child.

9. A user discrimination control system for use in controlling an electronic device in a vehicle adapted to transport an occupant, said system comprising:
 a driver distraction sensor for detecting a condition indicative of distraction of a driver of the vehicle; and
 a controller for controlling functions made available by the electronic device, wherein the controller provides one of first and second levels of functionality of the electronic device based on the sensed driver distraction condition.

10. The user discrimination control system as defined in claim 9, wherein the controller provides reduced functionality of the electronic device when the driver distraction sensor senses distraction of the driver of the vehicle.

11. The user discrimination control system as defined in claim 10, wherein the driver distraction sensor comprises an imaging camera for tracking a facial characteristic of the driver.

12. The user discrimination control system as defined in claim 11, wherein the facial characteristic comprises eye gaze of the driver.

13. The user discrimination control system as defined in claim 9, wherein the electronic device comprises an infotainment device.

14. The user discrimination control system as defined in claim 9 further comprising a human machine interface located in a passenger compartment of a vehicle for allowing an occupant of the vehicle to interface with an electronic device.

15. The user discrimination control system as defined in claim 14 further comprising a passenger detection sensor for sensing a condition indicative of a passenger other than the driver interfacing with the human machine interface, wherein the controller provides the one of first and second levels of functionality based further on the passenger detected condition.

16. The user discrimination control system as defined in claim 15, wherein the passenger sensor comprises a proximity sensor for detecting movement of the passenger in close proximity to the human machine interface.

17. The user discrimination control system as defined in claim 9 further comprising a sensor for detecting the presence of a passenger in the vehicle, wherein the controller provides reduced functionality when a passenger is not detected.

18. The user discrimination control system as defined in claim 17, wherein the system determines if the passenger is one of an adult and a child, wherein the controller reduces functionality of the system when the passenger is a child.

19. A method of controlling an electronic device in a vehicle adapted to transport a driver and one or more passengers, said method comprising the steps of:
 providing a human machine interface located in a passenger compartment of the vehicle for allowing an occupant in the vehicle to interface with an electronic device;
 sensing a passenger interface condition indicative of a passenger other than the driver interfacing with the human machine interface; and
 controlling functions made available by the electronic device by allowing one of first and second levels of functionality based on the sensed passenger interface condition.

20. The method as defined in claim 19 further comprising the step of sensing a driver distraction condition indicative of distraction of the driver and reducing functionality of the electronic device when driver distraction condition is detected.

21. The method as defined in claim 20, wherein the step of sensing a driver distraction condition comprises monitoring a facial characteristic of the driver with an imaging camera.

22. The method as defined in claim 21, wherein the step of monitoring a facial characteristic comprises monitoring eye gaze of the driver.

23. The method as defined in claim 21, wherein the step of sensing a passenger interface condition comprises detecting movement of the passenger in close proximity to the human machine interface, and wherein reduced functionality of the electronic device is allowed when movement is not detected.

24. A method of controlling an electronic device in a vehicle adaptive to transport an occupant, said method comprising the steps of:
 sensing a driver distraction condition indicative of distraction of a driver of the vehicle; and
 controlling functions made available by the electronic device by allowing one of first and second levels of functionality of the electronic device based on the sensed driver distraction condition.

25. The method as defined in claim 24, wherein the step of controlling functions comprises reducing functionality of the electronic device when the driver distraction condition is sensed.

26. The method as defined in claim 24, wherein the step of sensing a driver distraction condition comprises tracking a facial characteristic of the driver.

27. The method as defined in claim 26, wherein the step of tracking the facial characteristics of the driver comprises tracking eye gaze of the driver.

28. The method as defined in claim 24 further comprising the steps of:
 providing a human machine interface located in the passenger compartment of the vehicle for allowing an occupant in the vehicle to interface with the electronic device; and
 sensing a condition indicative of a passenger other than the driver interfacing with the human machine interface, wherein one of the first and second levels of functionality is allowed based further on the sensed passenger interfacing condition.

29. The method as defined in claim 28, wherein the step of sensing a passenger interfacing condition comprises of detecting movement of the passenger in close proximity to the human machine interface.

* * * * *